United States Patent [19]

Miichi et al.

[11] Patent Number: 5,519,614
[45] Date of Patent: May 21, 1996

[54] ELECTRONICALLY CONTROLLED POWER STEERING APPARATUS AND METHOD THEREFOR

[75] Inventors: Yoshinori Miichi; Mitsuhiko Harara; Tadao Tanaka, all of Okazaki, Japan

[73] Assignee: Mitsubishi Jidosha Kogyo Kabushiki Kaisha, Tokyo, Japan

[21] Appl. No.: 124,700

[22] Filed: Sep. 22, 1993

[30]   Foreign Application Priority Data

Sep. 22, 1992  [JP]  Japan ...................... 4-253173

[51] Int. Cl.$^6$ .................. B62D 5/04; B62D 6/00
[52] U.S. Cl. .................. 364/424.05; 180/79.1; 395/905
[58] Field of Search .......... 364/424.05, 426.01; 180/197, 199, 79.1, 140, 141, 142; 395/900, 905

[56]   References Cited

U.S. PATENT DOCUMENTS

| | | | |
|---|---|---|---|
| 4,541,499 | 9/1985 | Yanai et al. | 180/142 |
| 4,834,203 | 5/1989 | Takahashi et al. | 180/79.1 |
| 4,858,134 | 8/1989 | Eto et al. | 364/424.05 |
| 4,875,540 | 10/1989 | Oshita et al. | 180/79.1 |
| 4,909,343 | 3/1990 | Mouri et al. | 180/142 |
| 4,951,199 | 8/1990 | Whitehead | 364/424.05 |
| 5,067,576 | 11/1991 | Bober | 180/79.1 |
| 5,072,803 | 12/1991 | Kilian et al. | 364/424.1 |
| 5,123,497 | 7/1992 | Yopp et al. | 280/707 |
| 5,229,955 | 7/1993 | Nishiwaki et al. | 364/550 |
| 5,265,019 | 11/1993 | Harara et al. | 364/424.05 |
| 5,289,894 | 3/1994 | Yasui | 180/141 |

FOREIGN PATENT DOCUMENTS

| | | |
|---|---|---|
| 3525543 | 1/1986 | Germany. |
| 3728678 | 3/1988 | Germany. |
| 4243665 | 8/1992 | Japan. |

OTHER PUBLICATIONS

Japanese Patent Laid-Open No. 230472/1992, Laid-Open Aug. 19, 1992, Application No.:10396/1991; Hiroshi Ajimura et al. "Electronic Control Power Steering Device" with English Translation attached.

Japanese Patent Laid-Open No. 182576/1990, Laid-Open Jul. 17, 1990, Application No.:334763/1988; Shinichi Shoji "Power Steering Device" with English Translation Attch.

Japanese Utility Model Publication No. 41104, Nov. 1, 1990, Application No. 86260/1983 Toshio Etoh et al., "Power Steering Control Device" with English Translation attached.

*Primary Examiner*—Kevin J. Teska
*Assistant Examiner*—Tan Nguyen
*Attorney, Agent, or Firm*—Birch, Stewart Kolasch & Birch

[57]   ABSTRACT

An electronically controlled power steering apparatus responsive to a running condition of a vehicle includes a vehicle speed sensor for detecting a running speed of the vehicle, a detector for detecting a lateral acceleration of the vehicle, and a control unit for setting an aimed assist amount setting based upon the running speed detected by the vehicle speed sensor and the lateral acceleration detected by the lateral acceleration detector in accordance with a fuzzy rule.

17 Claims, 17 Drawing Sheets ns

ELECTRONICALLY CONTROLLED POWER STEERING APPARATUS AND METHOD THEREFOR

BACKGROUND OF THE INVENTION

1. Field of the Invention

This invention relates to an electronically controlled power steering apparatus which controls the steering assist amount of a steering mechanism of a vehicle, and more particularly to an electronically controlled power steering apparatus of the type wherein the aimed assist amount is set in response to lateral acceleration of the vehicle in accordance with a fuzzy rule.

2. Description of the Related Art

In recent years, power steering apparatuses have varied widely for assisting the force (hereinafter referred to as steering wheel operating force or steering force) for operating a steering wheel. Particularly, hydraulic power steering apparatuses which make use of a hydraulic cylinder mechanism to hydraulically assist the steering wheel operating force are popularly employed as such power steering apparatus. Also electrically operated power steering apparatuses wherein the steering wheel operating force is assisted by an electric motor have been developed.

Such power steering apparatuses as described above allow steering of a vehicle, for which high steering wheel operating force is required, such as, for example, a large size vehicle or a vehicle which employs wide tires on wheels for steering, to be performed with a low steering wheel operating force, eliminating so-called heavy operation of the steering wheel.

When the vehicle speed is low such as upon garaging, generally the steering operation is desired to be performed with a lower steering force. On the other hand, When the vehicle is running at a high speed, if the steering operation is very light, then running of the vehicle becomes unstable, and accordingly, the steering operation is desired to be rather heavy. Thus, a vehicle speed responsive power steering apparatus has been developed wherein the steering wheel operation is controlled in response to the speed of the vehicle such that, when the vehicle runs at a low speed, the steering assist amount is set to a comparatively high value so as to make the steering wheel operation lighter, but when the vehicle runs at a medium or high speed, the steering assist amount is set to a comparatively low value to make the steering wheel operation heavier.

In one such vehicle speed responsive power steering apparatus, a vehicle speed sensor is provided on the vehicle while a valve for adjusting hydraulic oil to be supplied to a power cylinder is provided in a hydraulic system of the hydraulic power steering apparatus. Operation of the valve is controlled in response to a vehicle speed detected by the vehicle speed sensor to adjust the steering assist amount. The vehicle speed responsive power steering apparatus of the type just mentioned is called an electronically controlled power steering apparatus.

In the following, construction of an exemplary conventional electronically controlled power steering apparatus will be described with reference to FIGS. 14 to 16.

Referring to FIGS. 14 to 16, an input shaft 11 is fitted for rotation in a casing 25 by means of bearings and is connected to receive steering force from a steering wheel (not shown). A pinion 12 is mounted for relative rotation at a lower end of the input shaft 11 with a bush or a like element (not shown) interposed therebetween.

A torsion bar 15 is located in the hollow inside of the input shaft 11. The torsion bar 15 is coupled at an upper end thereof for integral rotation to the input shaft 11 by way of a pin or a like element while it is not restrained at a lower end thereof by the input shaft 11.

The pinion 12 is held in serration coupling engagement with the lower end of the torsion bar 15 so that the steering force inputted to the input shaft 11 may be transmitted to the pinion 12 by way of the torsion bar 15. The pinion 12 is held in meshing engagement with a rack 13 so that the steering force may be transmitted to the rack 13 by way of the pinion 12 to move the rack 13 in its axial direction (in a direction perpendicular to the plane of FIG. 14) to steer wheels of the vehicle (not shown).

A power steering hydraulic cylinder 14 includes a cylinder 14A mounted on a member on the body of the vehicle, and a piston 14B provided intermediately of the rack 13 for movement in an axial direction in the cylinder section 14A together with the rack 13. The inside of the cylinder 14A is partitioned leftwardly and rightwardly by the piston 14B into a pair of oil chambers 14C and 14D.

A rotary valve 16 is provided for driving the hydraulic cylinder 14. Operating oil is supplied into or discharged from the left or right oil chamber 14C or 14D of the hydraulic cylinder 14 by opening or closing motion of the rotary valve 16 to provide steering assist force to the rack 13.

The rotary valve 16 is interposed between the input shaft 11 and the pinion 12 and is opened or closed in response to a difference in phase between the input shaft 11 and the pinion 12. In particular, when steering force is inputted to the input shaft 11, the input shaft 11 is rigid and presents little distortion, but the torsion bar 15 transmits the steering force to the pinion 12 while presenting some distortion. Consequently, the pinion 12 presents a difference in phase (angular position) with respect to the input shaft 11. The rotary valve 16 is opened or closed so as to produce required steering assist force in the steering direction in response to the difference in phase.

A plurality of reactive force plungers 17 for providing, upon steering, steering reactive force to increase the steering force (that is, steering reaction) are provided on an outer periphery of a lower portion of the input shaft 11 such that they surround the outer periphery of the input shaft as seen in FIG. 16. The reactive force plungers 17 receive, at chambers 17A at back portions thereof, hydraulic oil supplied thereto under the control of a hydraulic pressure control valve 18 to restrain the input shaft 11 to provide steering reactive force in response to the hydraulic pressure. The chambers 17A are communicated with an oil reservoir 24 by way of respective return orifices 22.

The hydraulic pressure control valve 18 is provided next to and extends in parallel to the input shaft 11 in the casing 25 as shown in FIG. 15 and includes a plunger 18A fitted for upward and downward sliding movement in the casing 25, a solenoid 19 for exerting upward axial force to the plunger 18A, and a spring 20 for normally biasing the plunger 18A downwardly.

The plunger 18A has a pair of oil passages 18B and 18C communicated with the oil reservoir 24, an annular oil passage 18D for communicating with the oil pump 23, another annular oil passage 18E for communicating with the chambers 17A of the reactive force plungers 17, and an oil passage 18F for communicating the annular oil passages 18D and 18E with each other. In short, operating oil under high pressure from the oil pump 23 is supplied from the annular oil passage 18D into the chambers 17A of the reactive force plungers 17 by way of the oil passage 18F and the annular oil passage 18E.

Upon steering, for example, while the vehicle stops or is running at a low speed, maximum current is supplied to the solenoid 19. Consequently, the plunger 18A is moved upwardly to its highest position in which the annular oil passage 18D is not communicated with the oil pump 23 and supply of oil to the chambers 17A of the reactive force plungers 17 is stopped. Consequently, the reactive plungers 17 do not restrain the input shaft 11, and steering can be performed with light-force.

On the other hand, for example, while the vehicle is running at a medium or high speed, the current supply to the solenoid 19 is decreased in response to an increase of the vehicle speed. Consequently, when the steering wheel is at its neutral position, the axial force of solenoid 19 on the plunger 18A decreases as the current decreases, and as the axial force decreases, the plunger 18A is moved down so that the annular oil passage 18D is communicated with the oil pump 23 to allow oil to be supplied to the chambers 17A of the reactive force plungers 17.

In this condition, the reactive force plungers 17 restrain the input shaft 11 to hold the steering Wheel at its neutral position. Then, if the steering wheel is moved a little from the neutral position, then the output of the oil pump 23 tries to rise. In this instance, the discharging pressure of the oil pump 23 acts upon the chambers 17A of the reactive force plungers 17 almost without being controlled by the hydraulic pressure control valve 18. Accordingly, in the proximity of the neutral position of the steering wheel, the steering force is increased and a sufficient response of the steering wheel at the neutral position is obtained, resulting in a feeling of stability of the steering wheel in the neutral position.

Upon steering while the vehicle is running at a medium or high speed, the output of the oil pump 23 rises, within an ordinary steering range, to increase the steering assist amount in response to steering of the steering wheel, that is, in response to an increase of the steering force. Meanwhile, the discharging pressure of the oil pump 23 acts upon the chambers 17A of the reactive force plungers 17 while being controlled by the hydraulic pressure control valve 18. Accordingly, the reactive force plungers 17 act to restrain the input shaft 11 to increase the steering response (steering force).

As a result, upon steering when the vehicle rune at a medium or high speed, the steering force is increased by an amount corresponding to the action of the reactive force plungers 17 as compared with the steering force acting upon steering when the vehicle stops or is running at a low speed. In short, the steering response is increased and a stable steering feeling is obtained. Particularly, when the current supply to the solenoid 19 is decreased in response to an increase of the vehicle speed, the steering assist amount decreases and the steering force (steering response) increases, and consequently, a more stable steering feeling can be obtained.

The steering assist characteristic can be controlled by adjusting the current to be supplied to the solenoid 19 in this manner. As seen from FIG. 16, the current to be supplied to the solenoid 19 is set by a control unit (control means) 30 in response to, in addition to vehicle speed information from a vehicle speed sensor 31, for example, mode setting information from an EPS (electronically controlled power steering) mode changeover switch 32 and an engine rotation signal from an engine speed sensor 33 or a like element to control the solenoid 19.

In particular, the EPS mode changeover switch 32 can selectively set a normal mode and a sport mode in which the steering force is increased beginning at a lower speed than in the normal mode. When one of the modes is set, the control unit 30 controls the steering assist characteristic of the power steering mechanism in accordance with the set mode. For example, when the sport mode is set the current to be supplied to the solenoid 19 is adjusted in response to vehicle speed information so as to present such an assist characteristic that the assist amount decreases gradually as the vehicle speed increases from a medium speed range of the speed $V_1$ as seen from FIG. 17. On the other hand, when the normal mode is set, the current to be supplied to the solenoid 19 is adjusted in response to vehicle speed information so as to present such an assist characteristic that the assist amount decreases gradually as the speed vehicle increases from a little higher speed range of the speed $V_2$ ($>V_1$).

Further, when trouble with a detection circuit is detected from vehicle speed information, an engine rotation signal or the like, the solenoid 19 is switched off to effect fail-safe control.

Another consideration is that the required steering force characteristic actually varies depending upon a running condition of the vehicle, that is, whether the vehicle is running straight forwardly or along a curve or whether the vehicle is being accelerated or braked. However, conventional electronically controlled power steering apparatus have not been successful in always providing an optimum steering feeling since they control the steering force merely in response to the speed of the vehicle as described above.

For example, when the vehicle advances to a corner, the steering force characteristic is desired to present somewhat heavy steering force so that the driver can grasp the running condition of the vehicle at that time from an appropriate variation of the steering force.

In particular, when the vehicle advances to a corner while being accelerated, the steering force characteristic is desired to present somewhat heavy steering force so that the driver can grasp the running condition of the vehicle appropriately at that time. However, with the conventional electronically controlled power steering apparatus, although the steering force characteristic presents a little heavy driving force as a result of acceleration, a sufficiently heavy driving force cannot be provided in most cases.

On the other hand, when the vehicle advances to a corner while being decelerated, the steering force characteristic is desired to present rather heavy steering force so that the driver can grasp the running condition of the vehicle then appropriately. However, with the conventional electronically controlled power steering apparatus, the steering force characteristic becomes higher by an amount corresponding to the deceleration.

Further, when the vehicle advances to a corner at a fixed speed, the steering force characteristic is desired to present a little heavier ("a little heavier" here represents heavier than "rather heavy") steering force so that the driver can grasp the running condition of the vehicles more appropriately. With the conventional electronically controlled power steering apparatus, however, the steering force characteristic does not present any variation then.

In addition to the electronically controlled power steering apparatus described above, several power steering apparatus have been proposed including a power steering apparatus disclosed in Japanese Utility Model Publication Application No. Heisei 2-41104 wherein the steering assist amount is varied when the output of one of a vehicle speed sensor and an acceleration sensor exceeds a predetermined value. Another power steering apparatus is disclosed in Japanese Patent Laid-Open Application No. Heisei 4-230472 wherein the steering assist amount is varied when it is detected from a lateral acceleration signal and a road friction coefficient that the turning condition of the vehicle approaches a critical condition. A further power steering apparatus is disclosed in Japanese Patent Laid-Open Application No. 2-182576 wherein the steering assist amount is varied in accordance with a fuzzy rule from the vehicle speed and an unevenness of the road.

However, also those power steering apparatuses fail to control the steering assist amount for the steering wheel so as to provide an optimum steering characteristic in response to a running condition of the vehicle and particularly do not always provide an optimum steering feeling, similarly to the conventional electronically controlled power steering apparatus described above.

SUMMARY OF THE INVENTION

It is an object of the present invention to provide an electronically controlled power steering apparatus by which an optimum steering characteristic can be obtained in response to a running condition of a vehicle, eliminating the problems described above.

In order to again the object described above, according to the present invention, there is provided an electronically controlled power steering apparatus which controls the steering assist amount of a steering mechanism of a vehicle, which comprises vehicle speed detection means for detecting a running speed of the vehicle, lateral acceleration detection means for detecting a lateral acceleration of the vehicle, and aimed assist amount setting means for inputting the running speed detected by the vehicle speed detection means and the lateral acceleration detected by the lateral acceleration detection means and setting an aimed assist amount in response to the inputs in accordance with a fuzzy rule.

With the electronically controlled power steering apparatus, since a running speed detected by the vehicle speed detection means and a lateral acceleration detected by the lateral acceleration detection means are inputted to calculate an input assist amount to control the steering assist amount of the steering mechanism of the vehicle, the aimed assist amount can be set so that a steering characteristic can be obtained in accordance with a running condition of the vehicle such as whether the vehicle is running straight forwardly or turning or whether the vehicle is being accelerated or braked.

In a preferred form of the present invention, the aimed assist amount setting means sets the aimed assist amount in accordance with the fuzzy rule using a membership function for evaluation of the running speed of the vehicle and another membership function for evaluation of the lateral acceleration of the vehicle so that the aimed assist amount may be increased or decreased in response to the magnitude of the running speed and may be increased or decreased in response to the magnitude of the lateral acceleration. Thus, the steering assist amount is decreased as the vehicle speed or the lateral acceleration increases. Consequently, when the vehicle speed is low, the steering characteristic is light and the steering operation feeling is light, but as the vehicle speed increases, the steering characteristic becomes heavier in operation and a steering operation feeling of higher stability is obtained. Further, the steering characteristic becomes heavier in operation as turning of the vehicle becomes sharper. In this manner, an optimum steering feeling can be obtained in accordance with the degree of turning, and the driver can grasp the turning condition of the vehicle from the steering feeling of the steering wheel.

In another preferred form of the present invention, the aimed assist amount setting means sets the aimed assist amount in accordance with the fuzzy rule using a membership function with which the aimed assist amount is set from an adaptation or a compatibility value (hereinafter the word "adaptation" being used) calculated for the running speed of the vehicle and another membership function with which the aimed assist amount is set from an adaptation calculated for the lateral acceleration of the vehicle so that the aimed assist amount may be decreased as the adaptation of the running speed increases and may be decreased as the adaptation of the lateral acceleration increases. Thus, fine control is allowed to enhance the steering characteristic.

In a further preferred form of the present invention, the membership function for evaluation of the lateral acceleration is set so that the aimed assist amount may be decreased as the adaptation of the lateral acceleration increases in a region in which the lateral acceleration is lower than a first predetermined value, but in another region in which the lateral acceleration is equal to or higher than a second predetermined value higher than the first predetermined value, the aimed assist amount may be increased as the adaptation of the lateral acceleration increases. Consequently, in the ordinary turning condition of the vehicle in which the lateral acceleration is lower than the first predetermined value, a steering feeling can be obtained in accordance with an increase of the lateral acceleration, that is, in accordance with a degree of turning. On the other hand, in the critical turning region in which the lateral acceleration is higher than the second predetermined value, the aimed assist amount is increased to make the steering characteristic in operation light so that the driver may have such a steering feeling that the vehicle is slipping (that is, such a steering feeling that the effectiveness of the steering wheel is deteriorated). Consequently, the driver is informed from the steering feeling of the steering wheel that the vehicle is approaching its critical turning condition.

In a still further preferred form of the present invention, the membership function for evaluation of the lateral acceleration is set so that the aimed assist amount may be fixed irrespective of the magnitude of the adaptation of the lateral acceleration in a further region between the first predetermined value and the second predetermined value. Consequently, sudden variation in the aimed assist amount in response to a variation of the lateral acceleration can be prevented.

In a yet further preferred form of the present invention, the lateral acceleration detection means includes a vehicle speed sensor for detecting the running speed of the vehicle and a steering angle sensor for detecting the steering angle of the vehicle and calculates the lateral acceleration based on results of detection by the vehicle speed sensor and the steering angle sensor. Consequently, where the vehicle is already equipped with a vehicle speed sensor and a steering angle for the object of some other control, no additional provision of sensor elements is required.

DETAILED DESCRIPTION OF THE PREFERRED EMBODIMENT

An electronically controlled power steering apparatus of the fuzzy control type according to a preferred embodiment of the present invention will be described subsequently with reference to FIGS. 1 to 11.

Figure 14:
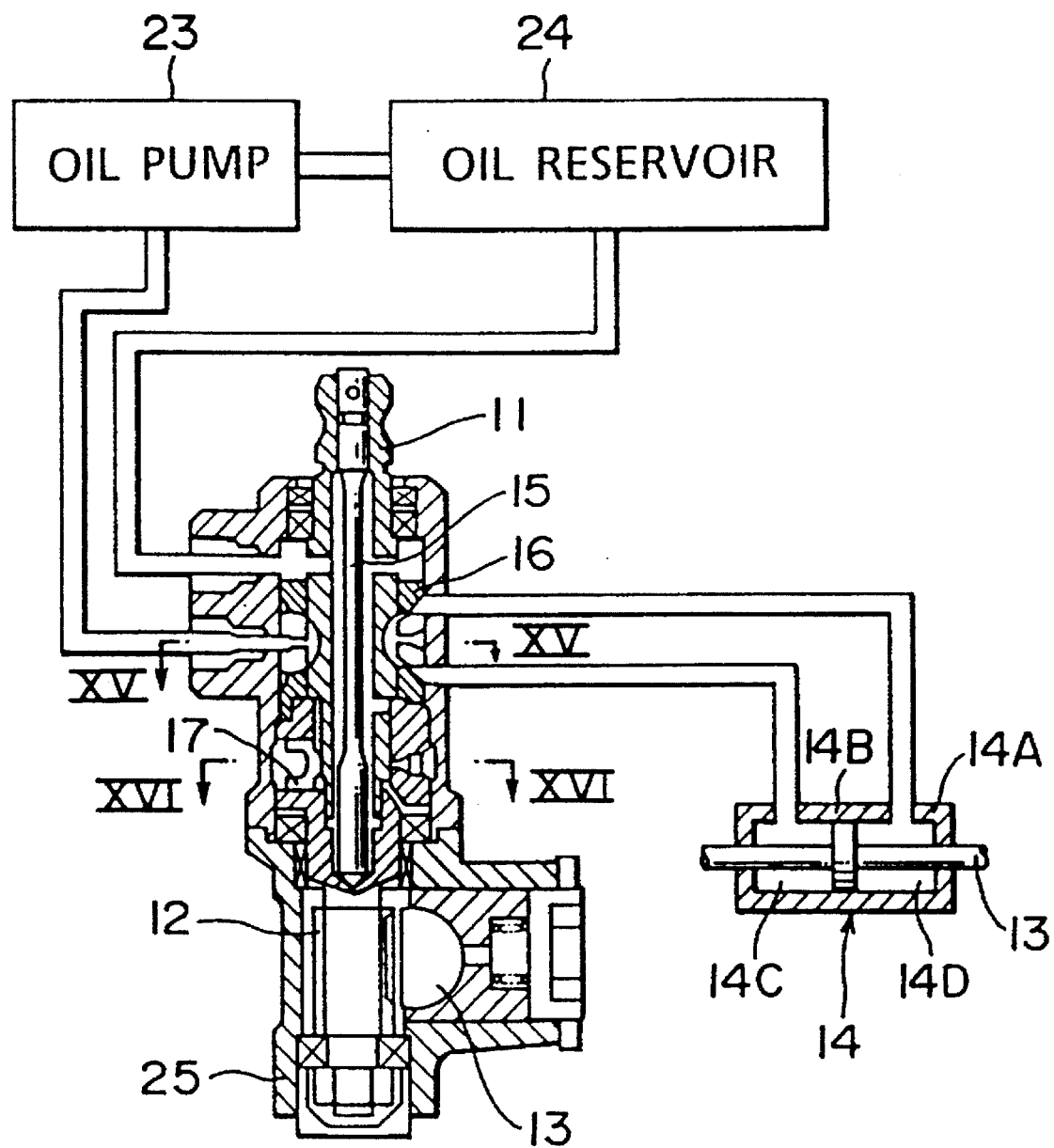
FIG. 14 is a sectional view showing an input shafts a pinion shaft and associated elements of a conventional electronically controlled power steering apparatus together with a power steering hydraulic cylinder.

The electronically controlled power steering apparatus 1 of the fuzzy control type has a mechanical section (hardware construction) substantially similar to that of the conventional electronically controlled power steering apparatus described hereinabove with reference to FIGS. 14 to 16, and accordingly, the mechanical section will be described briefly below.

Figure 1:
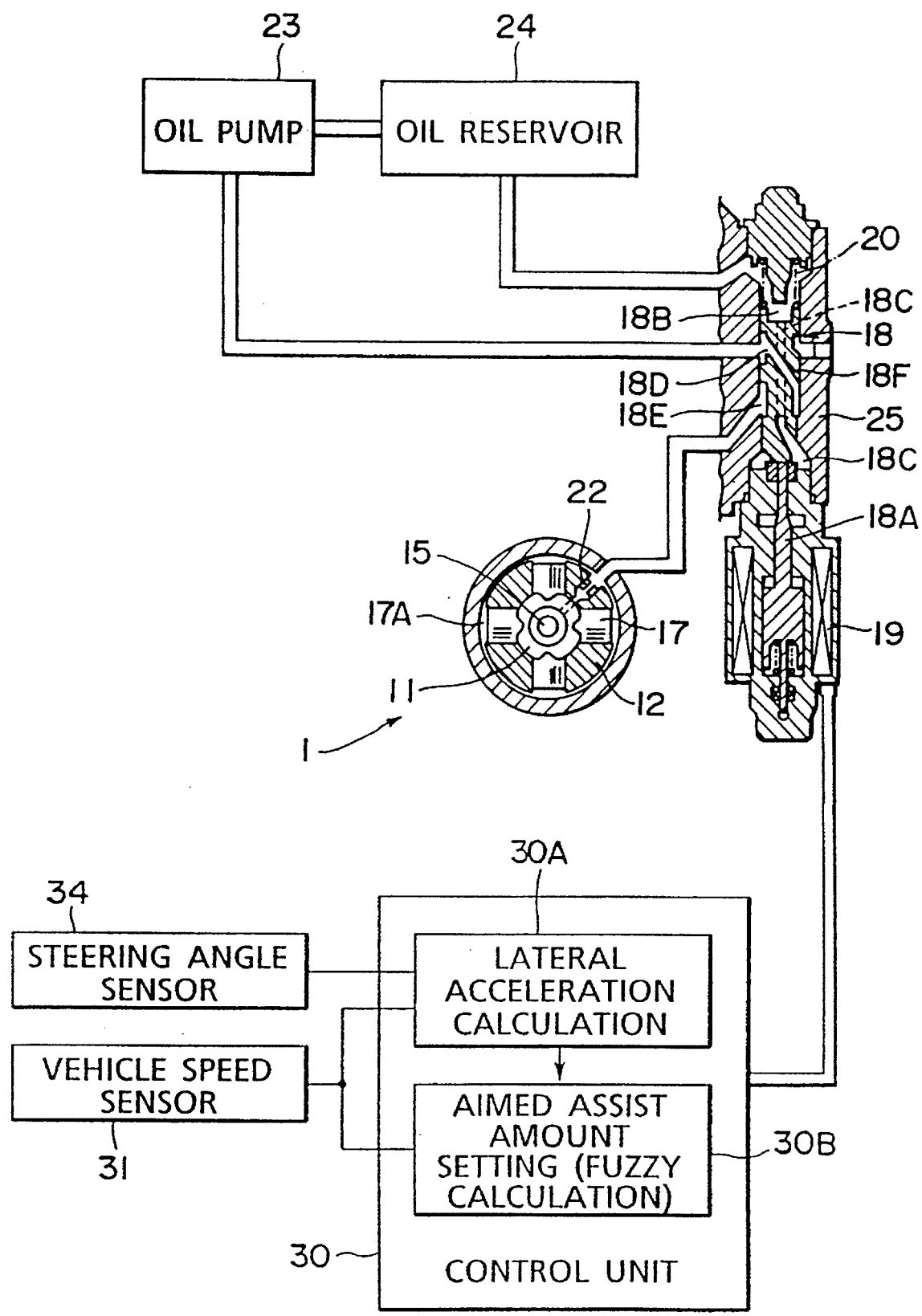
FIG. 1 is a schematic diagrammatic view of part of an electronically controlled power steering apparatus of the fuzzy control type showing a preferred embodiment of the present invention.
Figure 15:
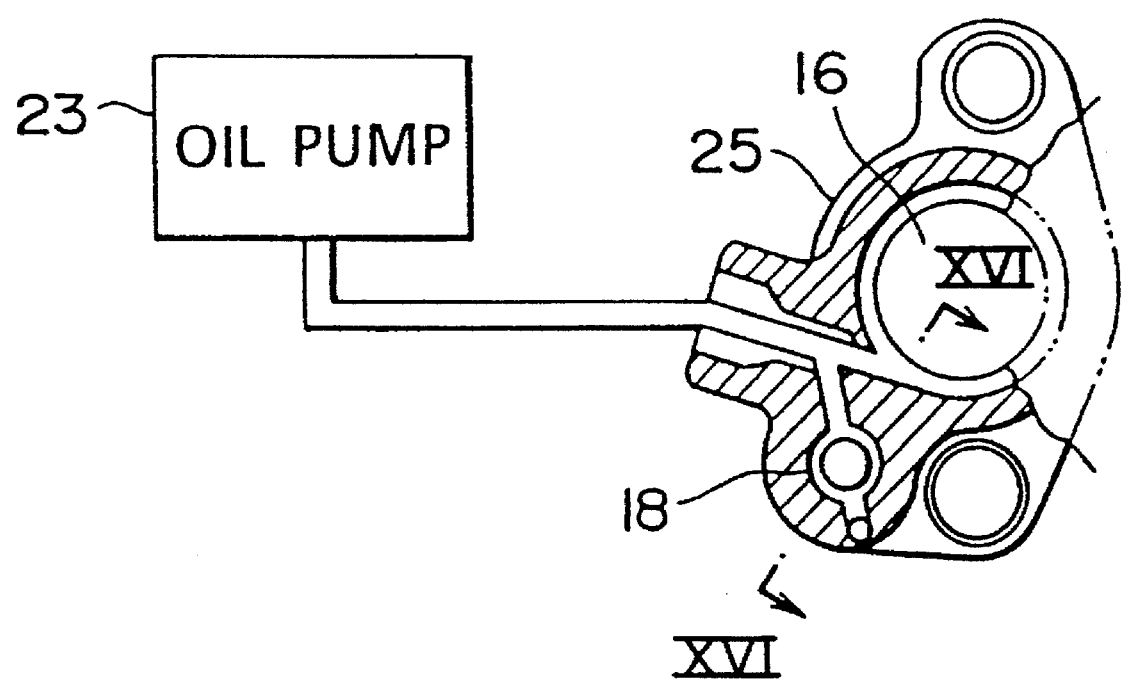
FIG. 15 is a transverse sectional view taken along line XV—XV of FIG. 14 showing the input shaft and associated elements of the conventional electronically controlled power steering apparatus of FIG. 14.
Figure 16:
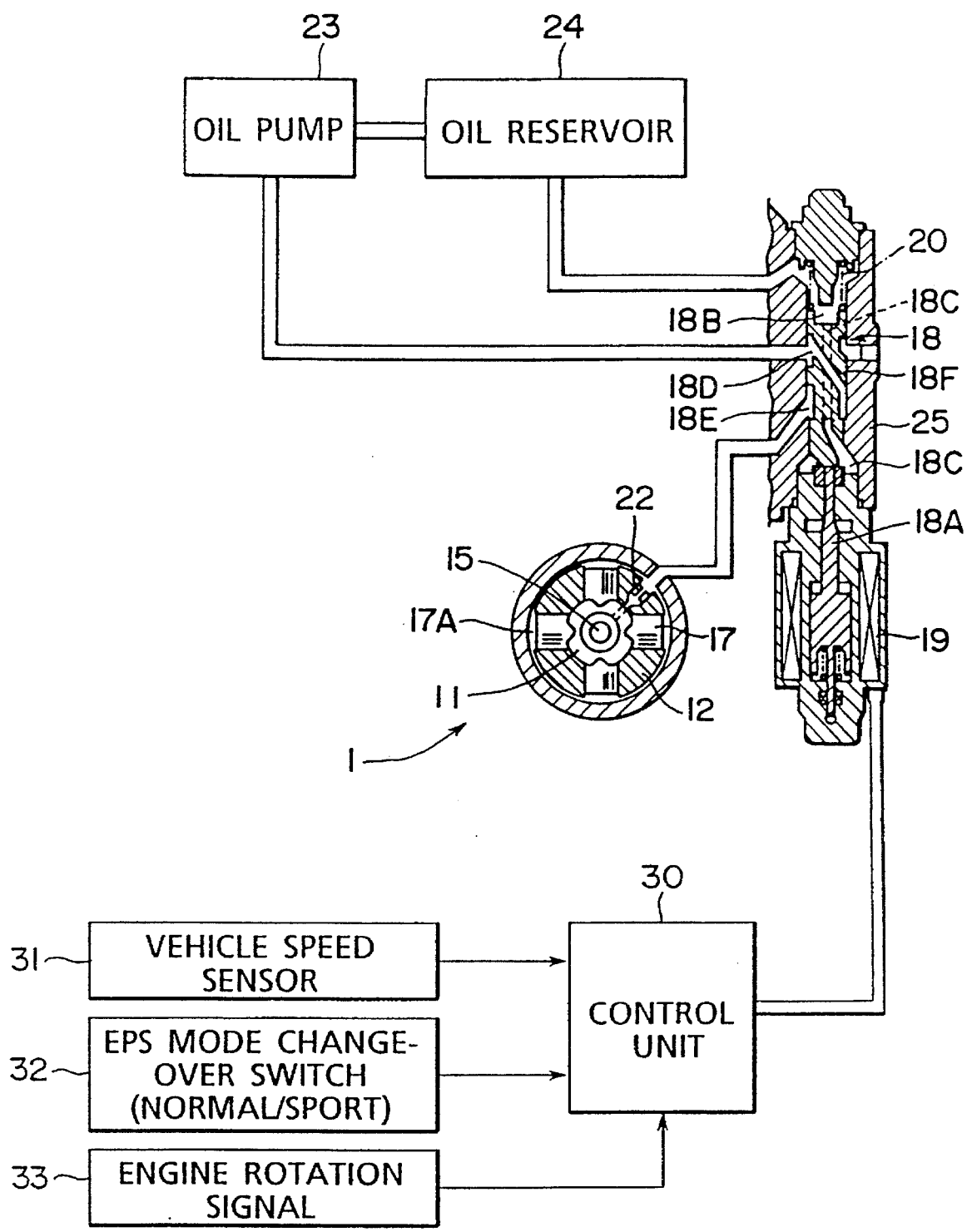
FIG. 16 is a diagrammatic sectional view taken along line XVI—XVI in FIG. 15 showing a hydraulic control valve provided alongside the input shaft of the conventional electronically controlled power steering apparatus of FIG. 14 while a reactive force plunger is shown in sectional view taken along line XVI—XVI in FIG. 14.
Figure 17:
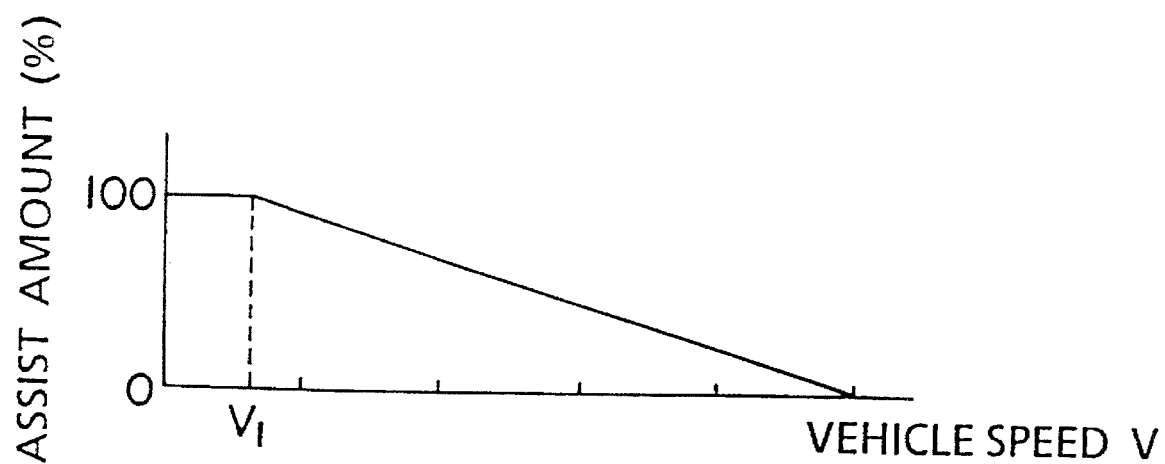
FIG. 17 is a diagram illustrating the characteristic of the assist amount of the conventional electronically controlled power steering apparatus of FIG. 14.

In particular, referring to FIGS. 1, 15 and 16, in the inside of an input shaft 11, a torsion bar 15 is coupled at an upper end thereof for integral rotation to the input shaft 11 while it is not restrained at a lower end thereof from the input shaft 11.

A pinion 12 is held in serration coupling engagement with the lower end of the torsion bar 15 so that the steering force inputted to the input shaft 11 may be transmitted to the pinion 12 by way of the torsion bar 15. The pinion 12 is held in meshing engagement with a rack 13 so that the steering force may be transmitted to the rack 13 by way of the pinion 12 to move the rack 13 in its axial direction to effect steering of wheels.

A hydraulic cylinder 14 is provided on the rack 13 and includes a cylinder 14A installed on a member on the body of the vehicle and a piston 14B located intermediately of the rack 13 for movement in an axial direction in the cylinder 14A together with the rack 13. The hollow inside of the cylinder 14A is partitioned by the piston 14B into a pair of oil chambers 14C and 14D.

A rotary valve 16 is interposed between the input shaft 11 and the pinion 12. The rotary valve 16 is opened or closed in response to a difference in phase (angular position) between the input shaft 11 and the pinion 12, and as the rotary valve 16 is opened or closed, operating oil is supplied into or discharged from the left or right oil chamber 14C or 14D of the hydraulic cylinder 14 so that steering assist force is provided to the rack 13.

A plurality of reactive force plungers 17 for exerting, upon steering, steering reactive force to increase the steering force (that is, steering response) are provided on an outer periphery of a lower portion of the input shaft 11 such that they surround the outer periphery of the input shaft 11. The reactive force plungers 17 receive, at chambers 17A at rear portions thereof, oil under pressure supplied under the control of a hydraulic pressure control valve 18 to restrain the input shaft 11 in response to the hydraulic pressure to exert steering reactive force. The chambers 17A are communicated with an oil reservoir 24 by way of respective return orifices 22.

The hydraulic pressure control valve 18 is provided next to and extends in parallel to the input shaft 11 in the casing 25. The hydraulic pressure control valve 18 includes a plunger 18A fitted for upward and downward sliding movement in the casing 25, a solenoid 19 for exerting upward axial force to the plunger 18A, and a spring 20 for normally biasing the plunger 18A downwardly.

The plunger 18A has a pair of oil passages 18B and 18C communicated with the oil reservoir 24, an annular oil passage 18D for communicating with an oil pump 23, another annular oil passage 18E for communicating with the chambers 17A of the reactive force plungers 17, and an oil passage 18F for communicating the annular oil passages 18D and 18E with each other. In short, operating oil under high pressure from the oil pump 23 is supplied from the annular oil passage 18D to the chambers 17A of the reactive force plungers 17 by way of the oil passage 18F and the annular oil passage 18E.

In the hydraulic pressure control valve 18 of the construction described above, the amount of current to be supplied to the solenoid 19 is set by way of a control unit (control means) 30 in response to vehicle speed information from a vehicle speed sensor 31, steering angle information from a steering angle sensor 34 and some other information to control the solenoid 19 as seen from FIG. 1.

In particular, the control unit 30 includes a lateral acceleration calculation section 30A, and aimed assist amount setting means (fuzzy calculation section) 30B for setting an aimed assist amount by fuzzy calculation. In the control unit 30, the lateral acceleration calculation section 30A calculates a lateral acceleration $G_y$ acting upon the vehicle from a vehicle speed V and a steering angle ha, and then the fuzzy control section 30B executes fuzzy calculation using the lateral acceleration $G_y$ and the vehicle speed V.

Figure 2A:
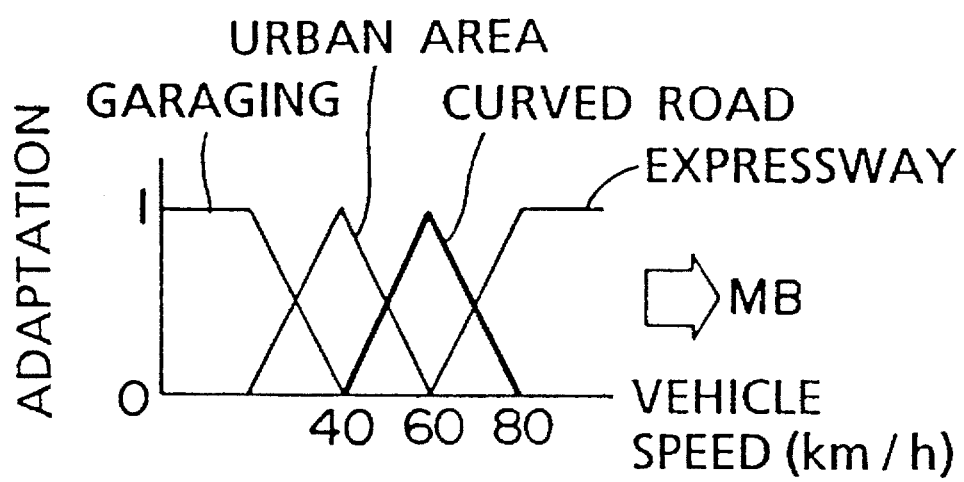
FIGS. 2(A) and 2(B) are diagrams illustrating examples of membership functions used for fuzzy control of the electronically controlled power steering apparatus of the fussy control type of FIG. 1.
Figure 2B:
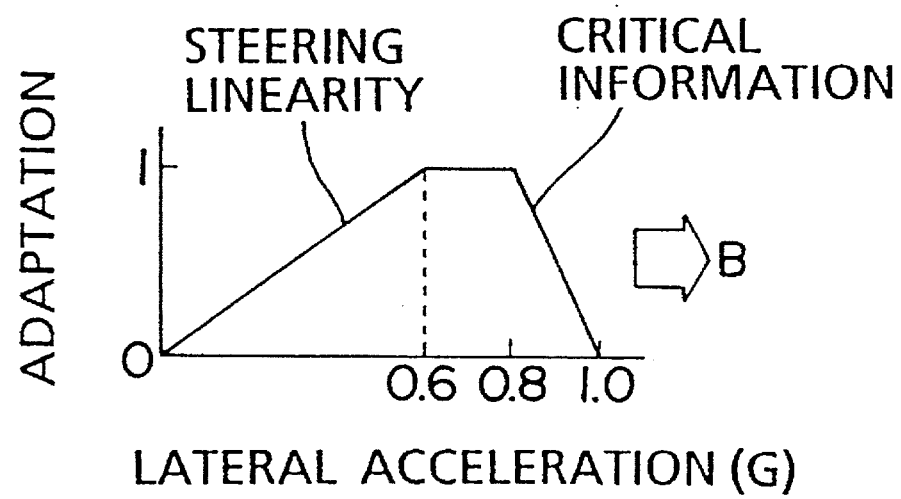
Figure 3:
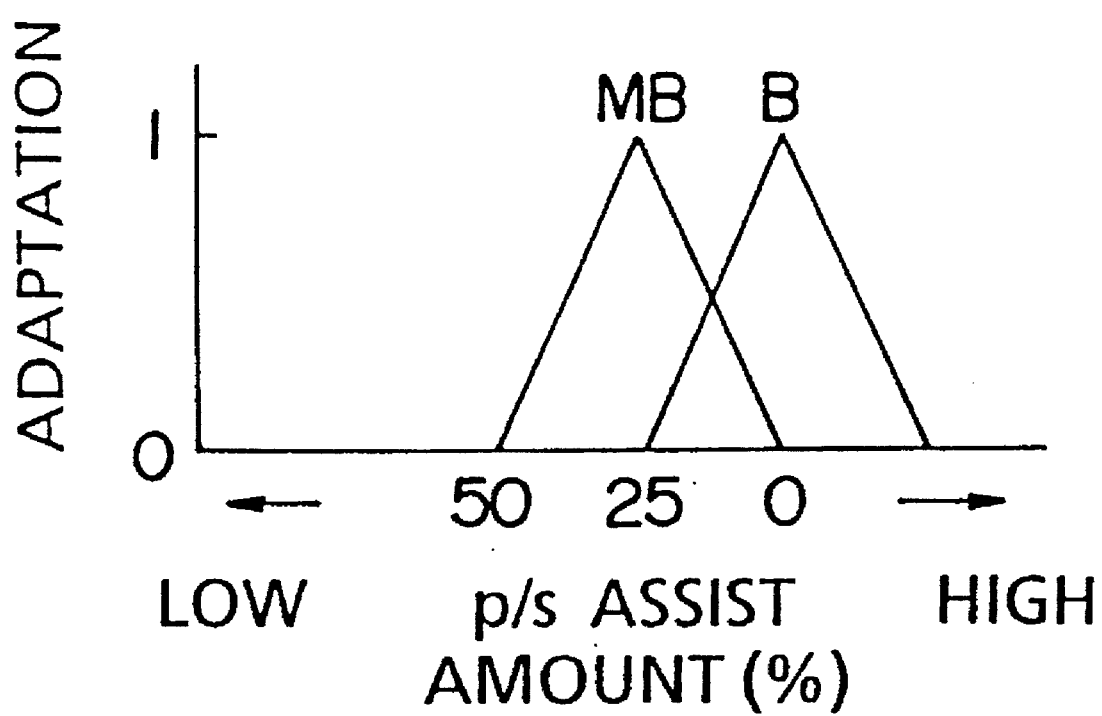
FIG. 3 is a diagram illustrating an example of trapezoidal set with which a power steering assist amount is calculated from an adaptation for use for fuzzy control of the electronically controlled steering apparatus of the fuzzy control type of FIG. 1.

In particular, in the rummy calculation section 30B, an adaptation or goodness of fit of the running condition and an adaptation or goodness of fit of the lateral acceleration $G_y$ are calculated from such a membership function with which an adaptation or goodness of fit (grade) of the running condition is calculated from the vehicle speed V as seen from FIG. 2(A) and such another membership function with which an adaptation or goodness of fit of the lateral acceleration $G_y$ is calculated as shown in FIG. 2(B). Then, from the adaptations, a control amount (that is, an amount by which the assist amount is to be reduced) is determined using the method of elastic center as seen from FIG. 3, in which a trapezoidal set is shown, to control the amount of current to be supplied to the solenoid 19.

In the present embodiment, as running conditions, four modes are set including a garaging mode (stopping steering or low speed running mode), an urban area mode (medium speed running mode), a curved road running mode and a high speed running mode, and an adaptation for each of chose modes is determined in response to a vehicle speed.

Figure 4:
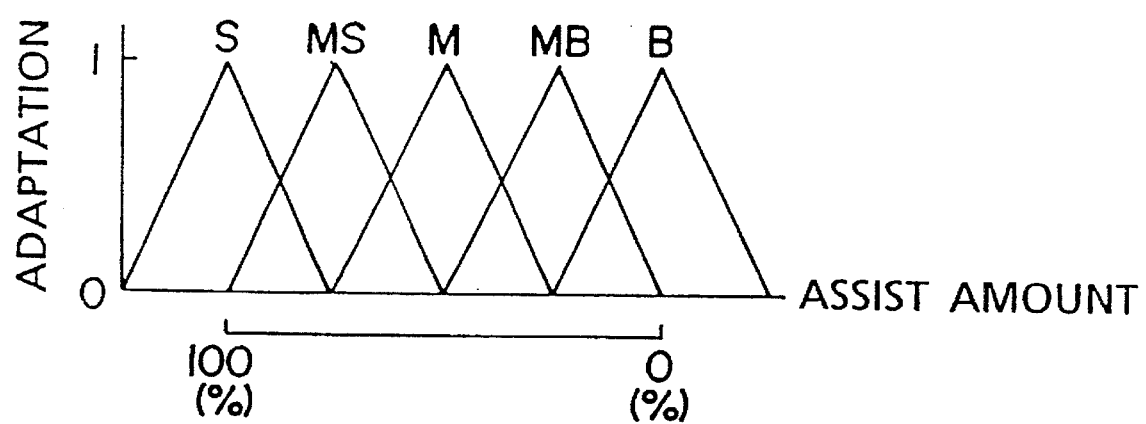
FIG. 4 is a similar view but illustrating another example of trapezoidal set with which a power steering assist amount is calculated from an adaptation for use for fuzzy control of the electronically controlled steering apparatus of the fuzzy control type of FIG. 1.

Principally, control regarding the curved road running mode is described here. Evaluation of the assist decreasing control amount is divided into five stages of S (small), MS (medium small), M (medium), MB (medium big) and B (big) as shown in FIG. 4. It is to be noted that the assist amount is set to 100% with the evaluation S, but is set to 0% with the evaluation B.

Then, the steering modes and the assist decreasing control amounts are made to correspond to each other such that, for example, the garaging mode (stopping steering or low speed running mode) corresponds to S; the medium speed running mode to M; the curved road running mode to MB; and the high speed running mode to B.

The membership function regarding the lateral acceleration value $G_y$ is set such that, in a region wherein the lateral acceleration value $G_y$ varies from a low level (0 G) to a medium level (0.6 G), the adaptation increases linearly in response to an increase of the lateral acceleration value $G_y$; in another region wherein the lateral acceleration value $G_y$ varies from the medium level (0.6 G) to a high level (0.8 G), the adaptation is fixed irrespective of an increase of the lateral acceleration value GY; and in a further region wherein the lateral acceleration value $G_y$ is higher than the high level (0.8 G), the adaptation decreases as the lateral acceleration $G_y$ increases.

The control regarding the lateral acceleration value $G_y$ decreases the assist decreasing control amount to B (big) in accordance with the adaptation.

From an adaptation regarding the running mode and another adaptation regarding the lateral acceleration value GY, an aimed assist amount is calculated using the method of elastic center.

Figure 7:
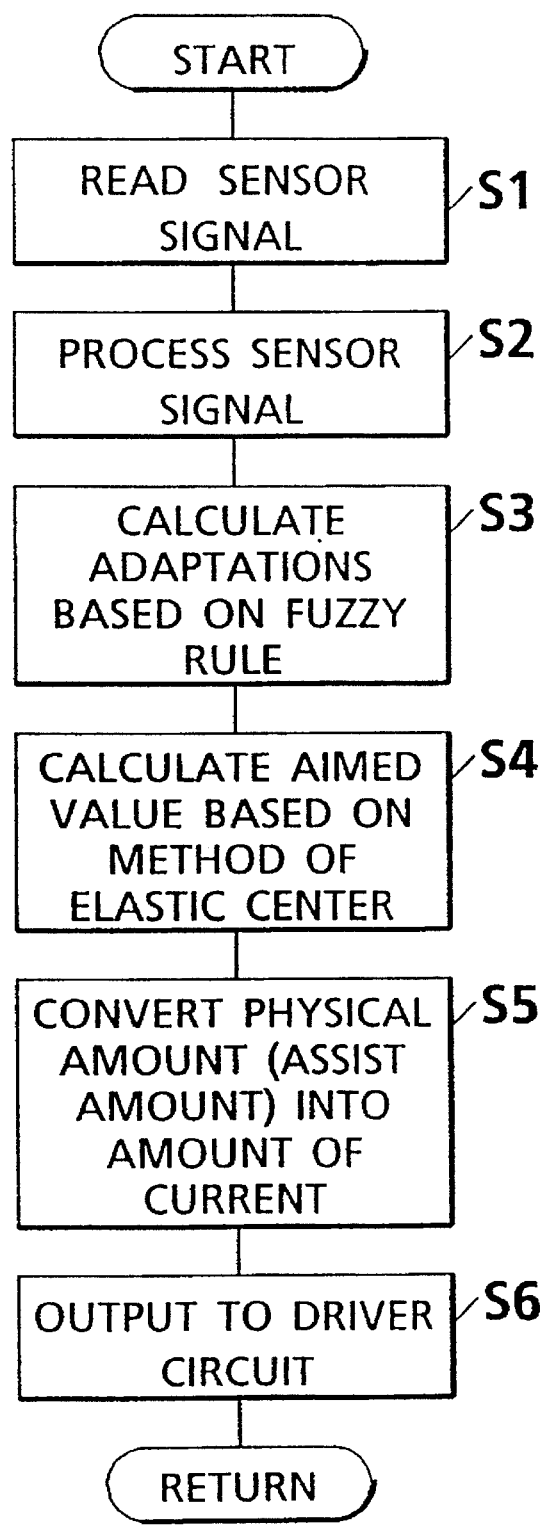
FIG. 7 is a flow chart illustrating successive steps of control of the electronically controlled steering apparatus of the fuzzy control type of FIG. 1.

Since the electronically controlled power steering apparatus of the fuzzy control type according to the embodiment of the present invention is constructed in such a manner as described above, electronic control of power steering is executed, for example, in such a manner as illustrated in FIG. 7.

Referring to FIG. 7, sensor signals from the vehicle speed sensor 31 and the steering angle sensor 34 are first read in step S1, and the sensor signals are inputted to the control unit 30, in which they are subsequently converted from analog signals into digital signals and then a lateral acceleration $G_y$ acting upon the vehicle is calculated by the lateral acceleration calculation section 30A from a vehicle speed V and a steering angle ha obtained by such analog to digital conversion (step S2).

Further, the fuzzy calculation section 30B calculates an adaptation regarding a running condition of the vehicle from the vehicle speed V using such a membership function as illustrated in FIG. 2 and calculates another adaptation regarding the lateral acceleration $G_y$ from the lateral acceleration $G_y$ (step S3).

Then, from the thus calculated adaptations, an aimed assist amount is determined using the method of elastic center (step S4). Further, the aimed assist amount is converted into a corresponding amount of current to be supplied to the solenoid 19 (step S5), and the amount of current is outputted by way of a driver circuit to the solenoid of the hydraulic pressure control valve 18 (step S6).

Here, a situation is considered wherein the vehicle begins from the condition wherein, for example, the vehicle speed V is 60 km/h and the vehicle is advancing straight forwardly (the lateral acceleration is 0 ), and progresses to the condition wherein the vehicle speed V is 50 km/h and the lateral acceleration is about 0.4 G. The situation corresponds to a situation wherein the vehicle advances, along a curved road, to a corner while heirs decelerated.

Figure 5:
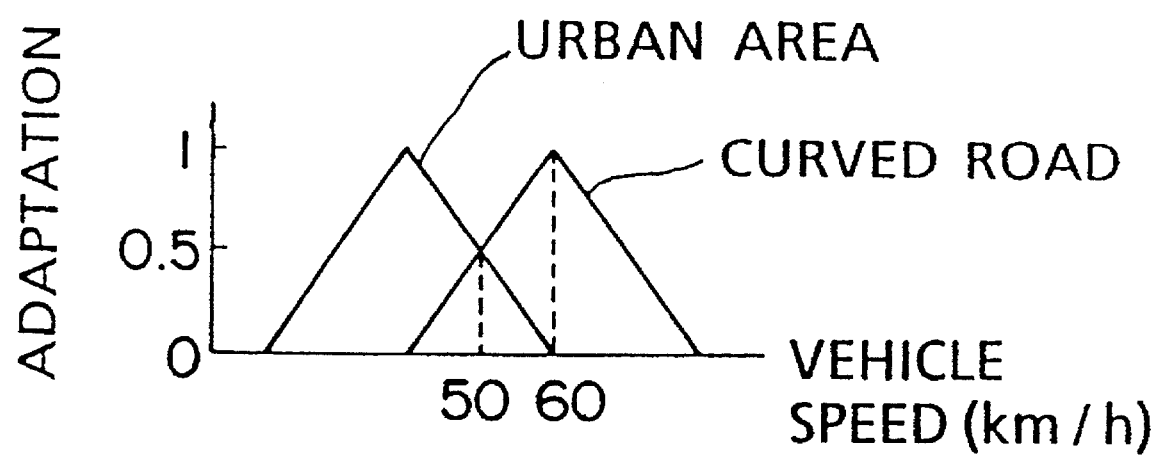
FIG. 5 is a diagram illustrating a specific example of calculation of a power steering assist amount from an adaptation for use for fuzzy control of the electronically controlled steering apparatus of the fuzzy control type of FIG. 1.

When the vehicle speed V is 60 km/h as shown in FIG. 5, the adaptation in Punning along a curved road is 1, but when the vehicle speed V drops to 50 km/h, the adaptation in running along a curve road drops to 0.5 and the adaptation in running in an urban area is 0.5. Further, for running along a cupped road, the assist decreasing control amount is MB, and for running in an urban area, the assist decreasing control amount is M. Then, when the lateral acceleration is 0, the adaptation is 0, but when the lateral acceleration is 0.4, the adaptation is 0.67.

Figure 6:
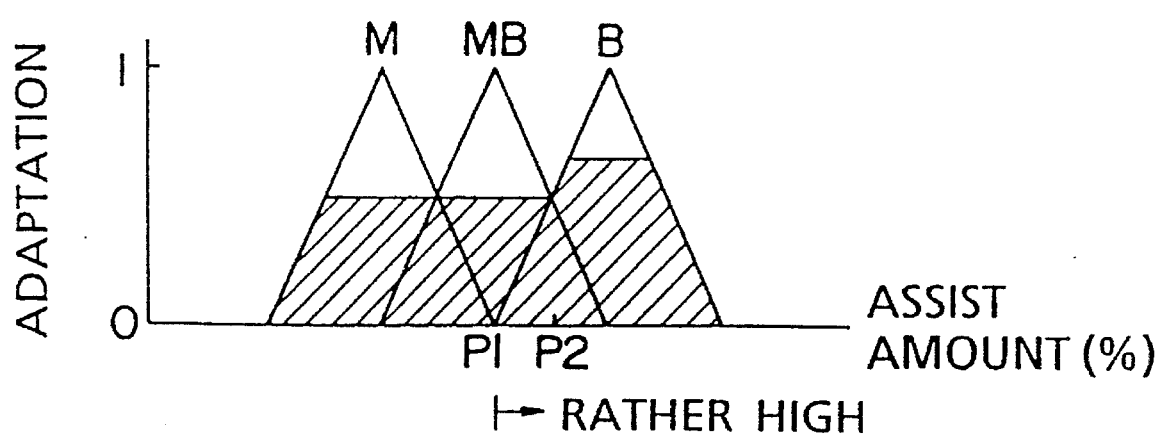
FIG. 6 is a similar view but illustrating another example of calculation of a power steering assist amount from an adaptation for use for fuzzy control of the electronically controlled steering apparatus of the fuzzy control type of FIG. 1.

Accordingly, when the vehicle speed v is 60 km/h and the lateral acceleration is 0, the assist decreasing control amount is MB (=assist amount 25%) as indicated at P1 in FIG. 6, but when the vehicle speed V is 50 km/h and the lateral acceleration is 0.6, the assist decreasing control amount shifts from MB to B as indicated at P2 in FIG. 6. In short, when the vehicle advances to a corner while it is being decelerated, the steering wheel becomes relatively heavy in operation.

Naturally, when the vehicle advances to a corner while being accelerated, reduction of the assist amount caused by an increase of the lateral acceleration overlaps with reduction of the assist amount caused by such acceleration of the vehicle, and consequently, the steering wheel becomes heavy in operation.

Since the assist amount is controlled in response to the lateral acceleration value $G_y$ in addition to an increase or decrease of the vehicle speed in this manner, when the vehicle advances to a corner, the steering angle increases, and consequently, the decreasing control amount increases and the steering wheel becomes heavier in operation by an amount corresponding to the decreasing degree. Accordingly, even if the vehicle speed condition is different, when the vehicle advances to a corner, the driver can steer the vehicle while always feeling such advancement to the corner from the steering wheel.

Further, since the membership function regarding the lateral acceleration value $G_y$ includes a steering linearity region in which the adaptation varies linearly with respect to the lateral acceleration value GY, the steering linearity is ensured. Then, since a steering critical information region in which the adaptation decreases in response to an increase of the lateral acceleration value $G_y$ is provided in the region in which the lateral acceleration value $G_y$ is high, the steering limit can be recognized readily.

Where the electronically controlled power steering apparatus of the fuzzy control type having such construction as described above is adopted for a front wheel driving vehicle (FF vehicle), the enhancement of the steering feeling is evaluated in the following manner from various points of view based on an experiment.

Figure 8:
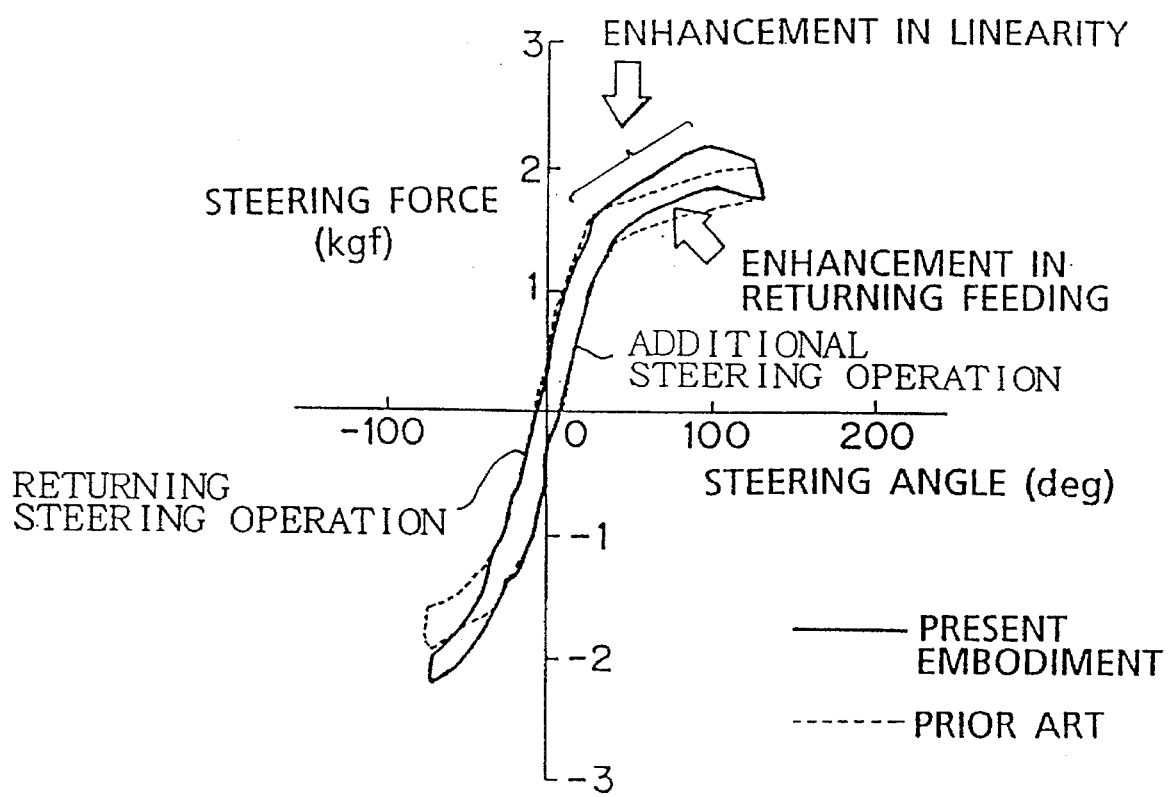
FIG. 8 is a diagram illustrating an effect regarding steering linearity of the electronically controlled steering apparatus of the fuzzy control type of FIG. 1.

First, as regards the steering linearity characteristic, such a result as shown in FIG. 8 has been obtained. FIG. 8 shows a Lissajous figure for about one period when the vehicle runs at the speed of about 40 to 60 km/h (at the maximum lateral acceleration of about 0.4 G to 0.9 G) along a mountain road along which curves of the radius from about 30 to 60 m successively appear. Referring to FIG. 8, the axis of abscissa represents the steering angle, and the axis of ordinate represents the steering force. Further, the solid line curve indicates the characteristic of the electronically controlled power steering apparatus of the fuzzy control type of the present embodiment, and the broken line curve indicates the characteristic of a conventional electronically controlled power steering apparatus.

As seen from the solid line curve in FIG. 8, the electronically controlled power steering apparatus of the fuzzy control type of the present embodiment presents a comparatively linear steering characteristic over a wide range to a range in which the steering angle is large (about ±80 deg), and accordingly, to a region in which the lateral acceleration acting upon the vehicle is high, comparing with the conventional electronically controlled power steering apparatus. Such comparatively linear steering characteristic is obtained in the steering linearity region of the membership function regarding the lateral acceleration value $G_y$.

Describing this in more detail, with the present electronically controlled power steering apparatus of the fuzzy control type, the graph exhibits a steep gradient in a region in which the steering angle is comparatively small, that is, in a neutral region (0 to about ±40 deg), and accordingly, the steering neutral feeling of the steering wheel is enhanced in the neutral region. Meanwhile, in another region in which the steering angle is medium (about ±40 to ±80 deg), the graph exhibits a rather steep gradient than that of the conventional electronically controlled power steering apparatus, and in this region, in addition to enhancement of the steering linearity, the steering reactive force on the returning side of the steering wheel is increased so that returning of the steering wheel is enhanced.

In contrast, with the conventional apparatus, such a linearity characteristic as indicated by a broken line in FIG. 8 is obtained and the neutral feeling is promoted in the proximity of the neutral region of the steering angle, similarly as with the apparatus of the present invention. However, in another region in which the steering angle is medium, the variation of the steering force relative to the steering angle decreases suddenly, resulting in decrease of the linearity as well as degradation of returning of the steering wheel.

Further, with the apparatus of the present invention, the steering force exhibits a sudden variation at its limit value in a critical region in which the steering angle is large (larder than about ±80 deg) as seen from the solid line curve in FIG. 8, and consequently, the driver of the vehicle can be informed of a critical condition of the vehicle from the steering feeling of the steering wheel. This represents an effect of the steering limit information area of the membership function regarding the lateral acceleration $G_y$.

It is to be noted that, in the present experiment, the steering wheel was not steered to the large steering angle region on the negative side, and accordingly, the effect of the steering limit information area does not appear in the region.

Meanwhile, in the proximity of the neutral position of the steering angle, the steering characteristic of the electronically controlled power steering apparatus of the fuzzy control type of the present embodiment exhibits a rather steep gradient comparing with that of the conventional electronically controlled power steering apparatus. In this region, the steering reactive force increases so that the steering neutral feeling is enhanced and also returning of the steering wheel is enhanced. It is to be noted that, with an apparatus wherein the assist amount control characteristic is varied, such a linearity characteristic as indicated by a chain line in FIG. 8 is obtained and the neutral feeling is promoted. However, in another region wherein the steering angle is large, the variation of the steering force relative to the steering angle decreases suddenly, resulting in decrease of the linearity.

It is to be noted that the steering force exhibits a sudden variation at its limit value as seen from the solid line curve in FIG. 8, which represents an effect of the steering limit information area of the membership function regarding the lateral acceleration $G_y$.

Figure 9:
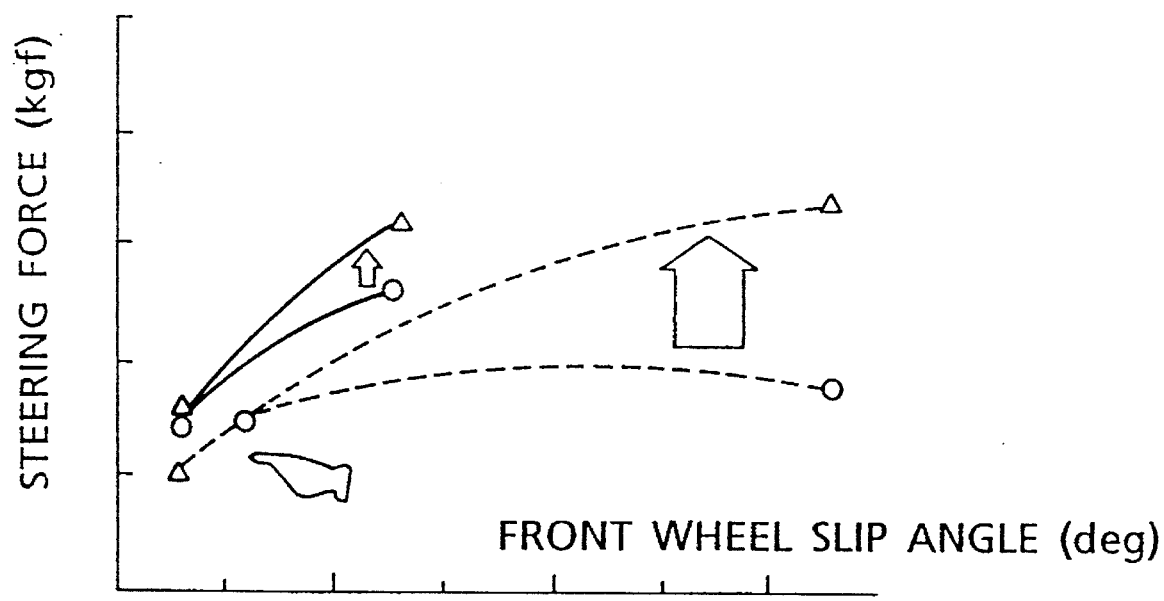
FIG. 9 is a diagram illustrating an effect regarding steering information of the electronically controlled steering apparatus of the fuzzy control type of FIG. 1.

Further, the characteristic of steering information is such as shown in FIG. 9. Referring to FIG. 9, the axis of the abscissa represents the front wheel slip angle and the axis of the ordinate represents the steering force. Further, the curves with the mark. Δ indicate the characteristic of the electronically controlled power steering apparatus of the fuzzy control type of the present embodiment, and the curves with the mark ◯ indicate the characteristic of the conventional electronically controlled power steering apparatus. Meanwhile, each solid line curve indicates a characteristic when the vehicle runs at a high speed (100 km/h), and each broken line curve indicates characteristic when the vehicle runs at a medium speed (60 km/h).

As seen from FIG. 9, the conventional electronically controlled power steering apparatus is advantageous in that it is easy to handle since the steering force thereof is generally low, but in a region wherein the front wheel slip angle is large, that is, in a region wherein the lateral acceleration acting upon the vehicle is high, the variation of the steering wheel force is so small that it is not sufficient as steering information for the operator. Further, a feeling of loss of steering force will be had in the region in which the lateral acceleration is high.

With the electronically controlled power steering apparatus of the fuzzy control type of the present embodiment, since the operator experiences a steering force which clearly varies over to the range in which the lateral acceleration is high, steering information is sufficient. Further, in a low speed range, the steering wheel is comparatively light in operation and is easy to handle. In this manner, with the present apparatus, both facility in handling in the low speed region and steering information (variation in steering force) can be realized with a good balance.

Figure 10:
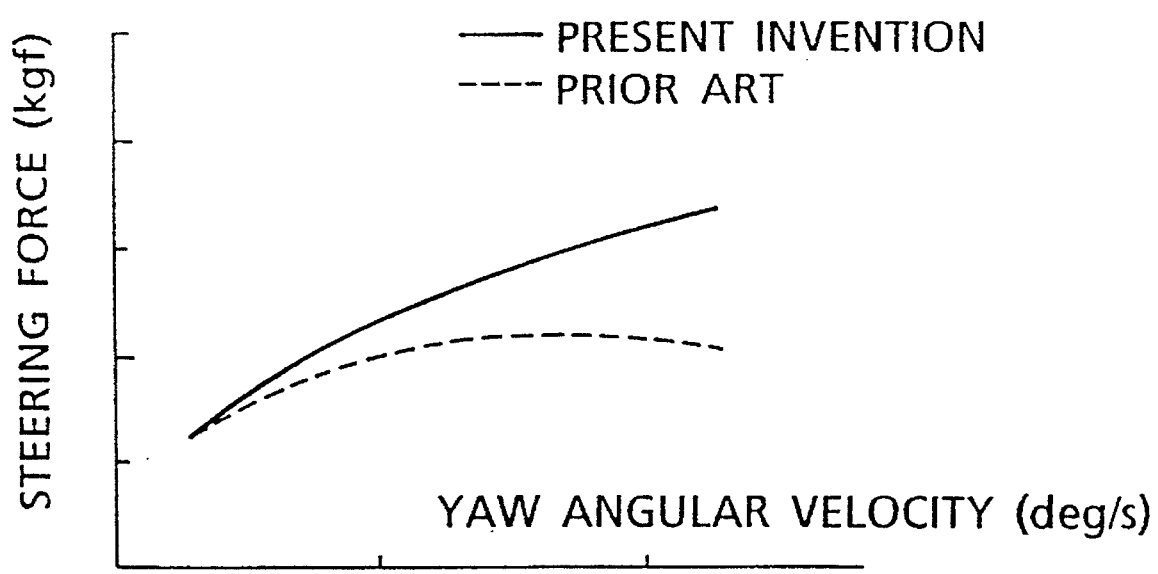
FIG. 10 is a similar view but illustrating an effect regarding vehicle controllability of the electronically controlled steering apparatus of the fuzzy control type of FIG. 1.

Further, the characteristic regarding the controllability of the vehicle is such as shown in FIG. 10. Referring to FIG. 10, the axis of the abscissa represents the yaw angular velocity of the vehicle and the axis of the ordinate represents the steering force. Further, the solid line curve indicates the characteristic of the electronically controlled power steering apparatus of the fuzzy control type of the present embodiment, and the broken line curve indicates the characteristic of the conventional electronically controlled power steering apparatus.

As seen from FIG. 10, with the conventional electronically controlled power steering apparatus, in a range wherein the yaw angular velocity is high, even if the yaw angular velocity varies, such variation does not cause a significant variation of the steering force, and variation in the effort required to turn the wheel cannot be detected readily. With the electronically controlled power steering apparatus of the fuzzy control type of the present embodiment, however, the steering force rises substantially linearly relative to the yaw angular velocity up to a range wherein the yaw angular velocity is high, and accordingly, the effort required to turn the vehicle varies and can be felt actually as steering force. Consequently, the controllability of the tracing performance of the vehicle is enhanced.

Figure 11:
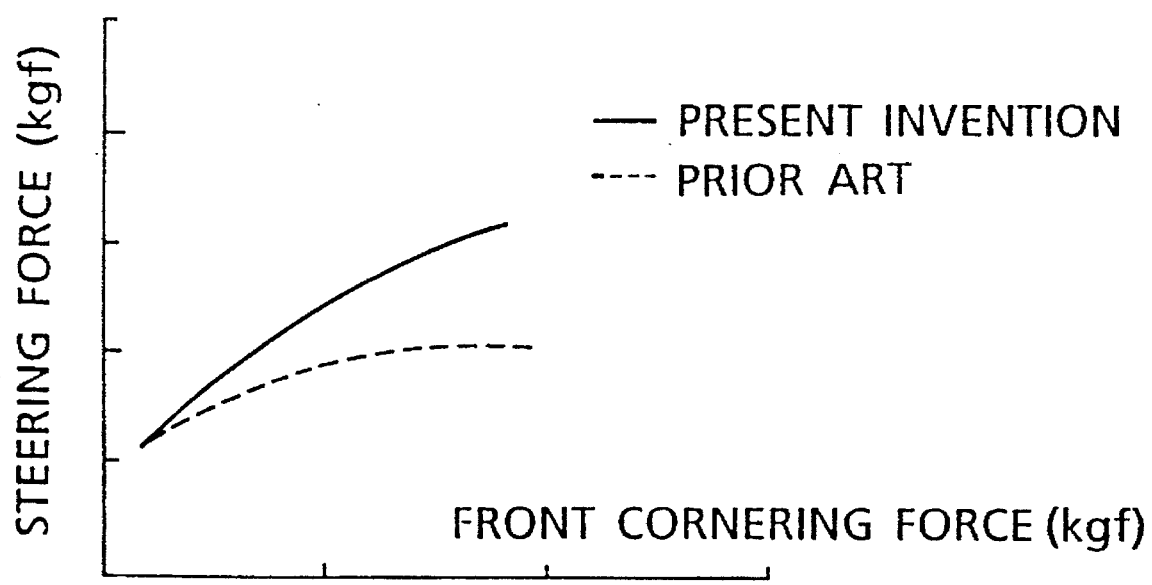
FIG. 11 is a similar view but illustrating an effect regarding effectiveness of steering of the electronically controlled steering apparatus of the fuzzy control type of FIG. 1.

Further, the steering effectiveness characteristic is such as illustrated in FIG. 11. Referring to FIG. 11, the axis of the abscissa represents the front cornering force of the vehicle and the axis of the ordinate represents the steering force. Further, the solid line curve indicates the characteristic of the electronically controlled power steering apparatus of the fuzzy control type of the present embodiment and the broken line curve indicates the characteristic of the conventional electronically controlled power steering apparatus.

As seen from FIG. 11, with the electronically controlled power steering apparatus of the fuzzy control type of the present embodiment, the steering force rises linearly with respect to the cornering force (effectiveness in steering), and steering accuracy is enhanced. Consequently, additional or corrective steering operations of the steering wheel can be reduced.

In this manner, with the electronically controlled power steering apparatus of the fuzzy control type of the present embodiment, fine control is facilitated and the steering force characteristics are enhanced significantly particularly in regard to running of the vehicle along a curved road.

It is to be noted that, while the control system of the electronically controlled power steering apparatus of the embodiment described above is described as being of the hydraulic type, the present invention is not limited to the specific type, and similar effects can be exhibited also where the present invention is applied to an electronically controlled power steering apparatus which employs an electric motor. Further, also the mechanical system of the electronically controlled power steering apparatus is not limited to that of the embodiment described above, but the present invention can be applied to an electronically controlled power steering apparatus which employs any mechanical system.

Figure 12:
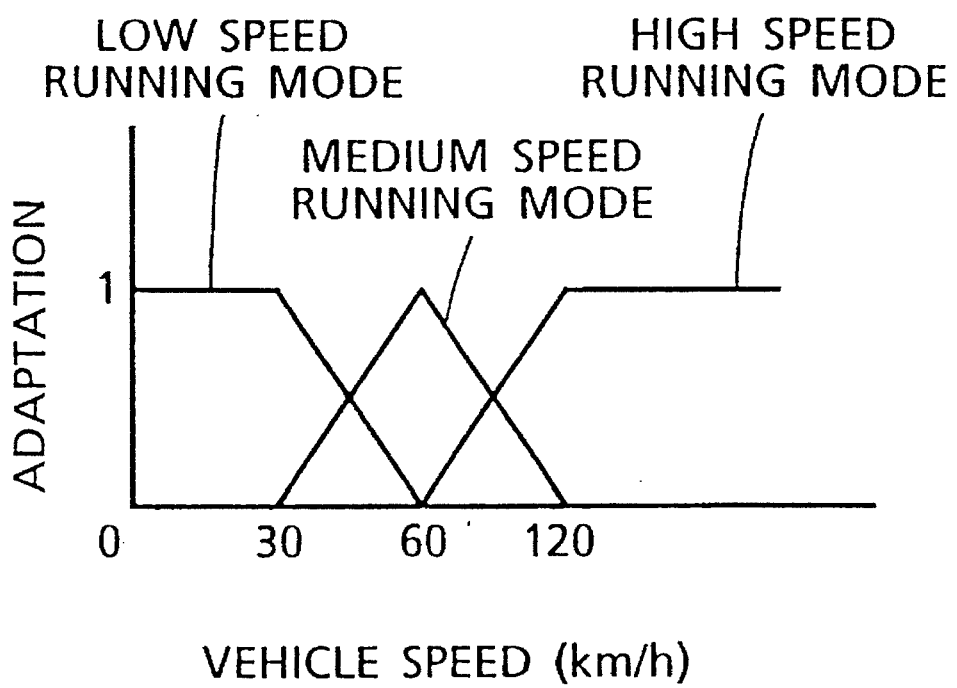
FIG. 12(A) is a diagram illustrating another example of membership function on a vehicle speed for use for fuzzy control.
FIG. 12(B) illustrates an example of trapezoidal set far calculation of a power steering assist amount.
Figure 12:
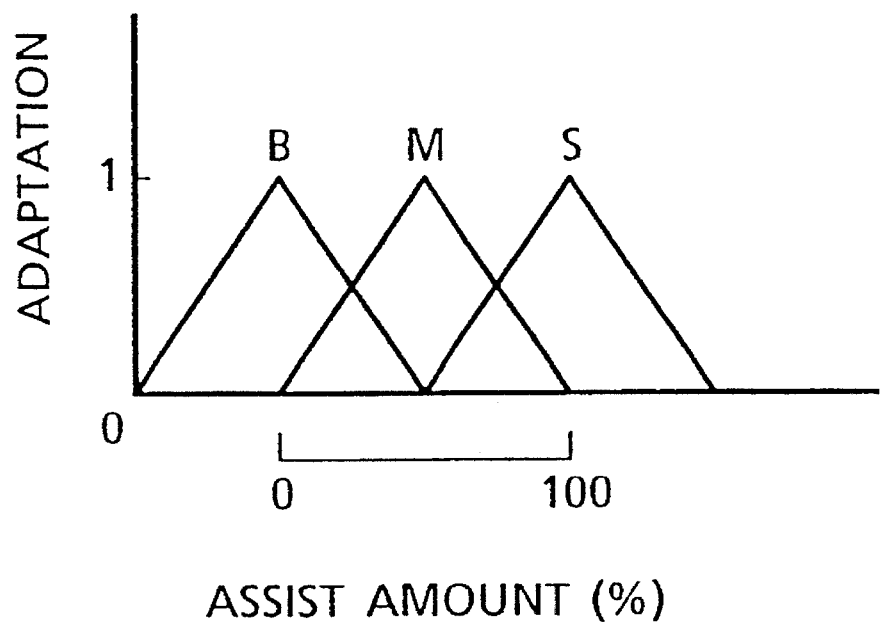
Figure 13:
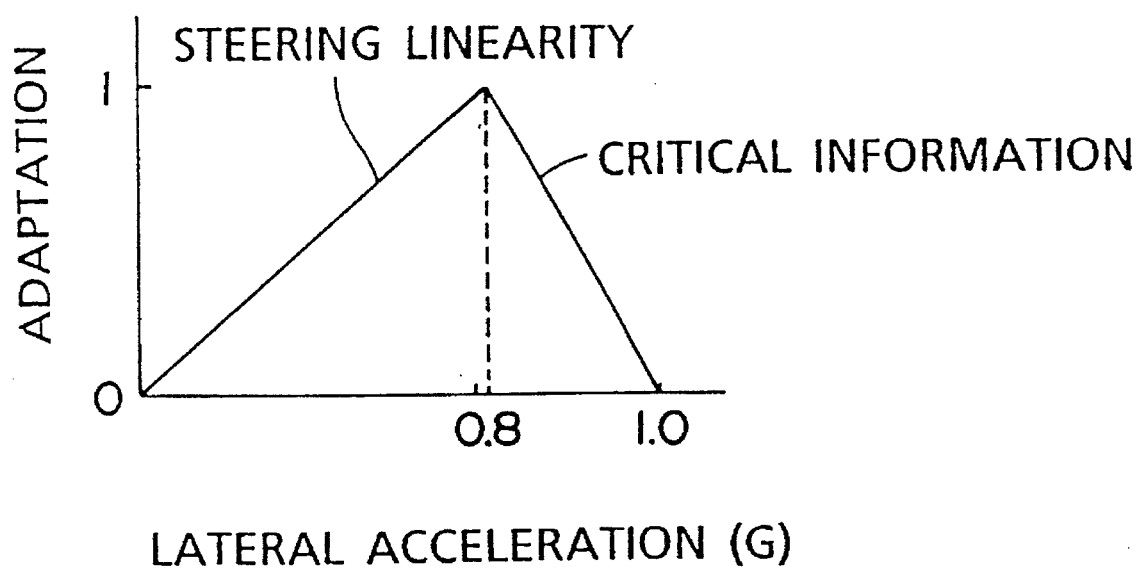
FIG. 13 is a diagram illustrating a further example of membership function on a lateral acceleration for use for fuzzy control.

Further, while, in the embodiment described above, the lateral acceleration calculation section 30A is provided in the control unit 30 and calculates a lateral acceleration $G_y$ acting upon the vehicle using a vehicle speed V inputted from the vehicle speed sensor 31 and a steering angle ha inputted from the steering angle sensor 34, such lateral acceleration $G_y$ may otherwise be measured directly by means of a lateral acceleration sensor mounted on the vehicle. Further, while the membership function of the vehicle speed V and evaluation of the steering assist amount are each divided into 5 stages, in order to achieve simplified control, they may each be divided into, for example, 3 stages as seen in FIGS. 12(A) and 12(B). Further, while the membership function of the lateral acceleration has the region (0.6 G to 0.8 G) wherein the aimed assist amount is fixed irrespective of the magnitude of the lateral acceleration, it need not have an area wherein the aimed assist amount is fixed as seen from FIG. 13. Furthermore, while the steering assist amount is calculated using the method of elastic center, it may otherwise be calculated using the maximum average method, the height method (skeleton method) or the area method.

Further, while, in the embodiment described above, the aimed assist amount is set in accordance with the fuzzy rule by the control unit (aimed assist amount setting means) 30, it may otherwise be set using some other control means.

What is claimed is:

1. An electronically controlled power steering apparatus which controls a steering assist amount of a steering mechanism of a vehicle, comprising:

vehicle speed detection means for detecting a running speed of said vehicle;

lateral acceleration detection means for detecting a lateral acceleration of said vehicle; and aimed assist amount setting means for receiving inputs of the running speed detected by said vehicle speed detection means and the lateral acceleration detected by said lateral acceleration detection means and setting an aimed assist amount, wherein said aimed assist amount setting means decreases the aimed assist amount as the lateral acceleration increases in a first range where the lateral acceleration is lower than a predetermined value, and increases the aimed assist amount as the lateral acceleration increases in a second range where the lateral acceleration is higher than that in the first range.

2. The electronically controlled power steering apparatus according to claim 1, wherein said aimed assist amount setting means comprises means for setting the aimed assist amount in accordance with a fuzzy rule using a first membership function for evaluation of the running speed of said vehicle and a second membership function for evaluation of the lateral acceleration of said vehicle whereby the aimed assist amount is increased or decreased in response to the magnitude of the running speed and is increased or decreased in response to the magnitude of the lateral acceleration.

3. The electronically controlled power steering apparatus according to claim 2, wherein said aimed assist amount setting means sets the aimed assist amount in accordance with the fuzzy rule whereby the aimed assist amount is decreased as the running speed increases and is decreased as the lateral acceleration increases.

4. The electronically controlled power steering apparatus according to claim 2, wherein said aimed assist amount setting means sets the aimed assist amount in accordance with the fuzzy rule using a membership function with which the aimed assist amount is set from a first adaptation calculated for the running speed of said vehicle and another membership function with which the aimed assist amount is set from a second adaptation calculated for the lateral acceleration of said vehicle whereby the aimed assist amount is decreased as the first adaptation of the running speed increases and is decreased as the second adaptation of the lateral acceleration increases.

5. The electronically controlled power steering apparatus according to claim 4, wherein the membership function for evaluation of the lateral acceleration is set so that the aimed assist amount is decreased as a first adaptation of the lateral acceleration increases in a first range where the lateral acceleration is lower than a first predetermined value, the aimed assist amount is increased as the first adaptation of the lateral acceleration increases in a second range where the lateral acceleration is equal to or higher than a second predetermined value which is higher than the first predetermined value, and the aimed assist amount is fixed irrespective of the magnitude of the first adaptation of the lateral acceleration in a third range where the lateral acceleration lies between the first predetermined value and the second predetermined value.

6. The electronically controlled power steering apparatus according to claim 1, wherein said vehicle speed detection means includes a vehicle speed sensor for detecting the running speed of said vehicle and said lateral acceleration detection means includes a steering angle sensor for detecting the steering angle of said vehicle and means for calculating the lateral acceleration by calculation based on results of detection by said vehicle speed sensor and said steering angle sensor.

7. The electronically controlled power steering apparatus according to claim 1, wherein said lateral acceleration detection means includes a sensor for directly detecting lateral acceleration forces.

8. The electronically controlled power steering apparatus according to claim 1, wherein the aimed assist amount is set so that the aimed assist amount is decreased as the lateral acceleration increases in a first range where the lateral acceleration is lower than a first predetermined value, the aimed assist amount is increased as the lateral acceleration increases in a second range where the lateral acceleration is equal to or higher than a second predetermined value which is higher than the first predetermined value, and the aimed assist amount is fixed irrespective of the magnitude of the lateral acceleration in a third range where the lateral acceleration lies between the first predetermined value and the second predetermined value.

9. In a vehicle equipped with means for providing power assist for steering of the vehicle, a method comprising the steps of:

varying the amount of steering power assist based upon a speed of the vehicle and upon a lateral acceleration of the vehicle, wherein said power assist means decreases the power assist amount as the lateral acceleration increases in a first range where the lateral acceleration is lower than a predetermined value, and increases said power assist amount as the lateral acceleration increases in a second range where the lateral acceleration is higher than that in the first range.

10. The method of claim 9, wherein the power assist amount is decreased when vehicle speed increases and the power assist amount is increased when the vehicle speed decreases.

11. The method of claim 9, wherein the power assist amount is maintained constant with varying vehicle speed up to a preselected speed, and the power assist amount is decreased as vehicle speed increases above said preselected speed.

12. The method of claim 11, comprising a first mode of operation and a second mode of operation, wherein said preselected speed is higher in said second mode than in said first mode.

13. The method of claim 9, further comprising the steps of detecting vehicle speed and detecting lateral acceleration of the vehicle.

14. The method of claim 13, wherein said step of detecting lateral acceleration of the vehicle comprises detecting vehicle speed and detecting a steering angle of the vehicle.

15. The method of claim 9, wherein the power assist amount is decreased as lateral acceleration of the vehicle increases when the lateral acceleration is equal to or less than a first value;

wherein said power assist amount is maintained constant when the lateral acceleration of the vehicle is greater than said first value but less than a greater second value; and wherein said power assist amount is increased as the lateral acceleration of the vehicle increases above said second value.

16. The method of claim 9, wherein the power assist amount is decreased when lateral acceleration of the vehicle increases and the power assist amount is increased when lateral acceleration of the vehicle decreases.

17. In a vehicle equipped with means for providing power assist for steering of the vehicle, a method comprising the steps of:

varying the amount of steering power assist based upon a speed of the vehicle and upon a lateral acceleration of the vehicle, wherein the power assist amount is decreased as the lateral acceleration increases in a first range where the lateral acceleration is lower than a predetermined value, and is increased as the lateral acceleration increases in a second range where the lateral acceleration is higher than that in the first range.

* * * * *